June 6, 1933.   G. GRAFF   1,913,026
VEHICLE HARDWARE
Filed Nov. 4, 1929
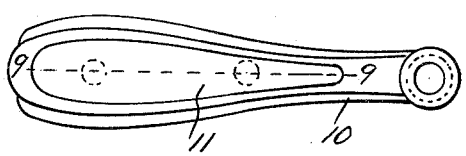
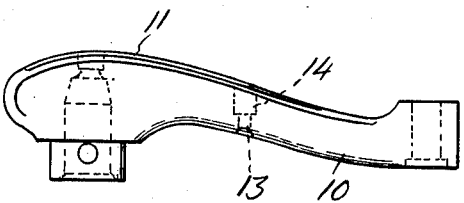
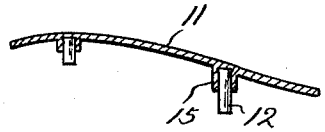
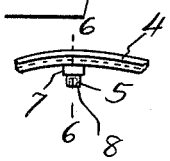
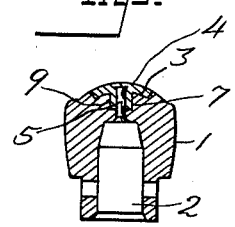
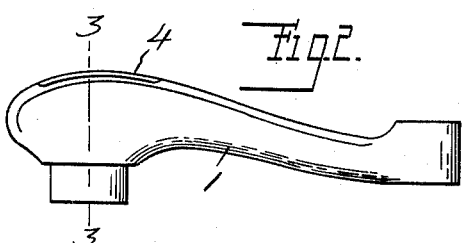
INVENTOR
George Graff
BY
Whittemore Hulbert Whittemore Belknap
ATTORNEYS Patented June 6, 1933

1,913,026

UNITED STATES PATENT OFFICE

GEORGE GRAFF, OF TOLEDO, OHIO, ASSIGNOR TO THE DURA COMPANY, OF TOLEDO, OHIO, A CORPORATION OF OHIO

VEHICLE HARDWARE

Application filed November 4, 1929. Serial No. 404,771.

The invention relates to vehicle hardware and is particularly applicable to hardware for automobiles. One of the objects of the invention is to provide vehicle hardware which may be ornamental and distinctive in appearance. Another object is to provide an improved ornamental member which may be readily and firmly secured to the body of the vehicle hardware article. A further object is to provide an improved means for securing the ornamental member to the body. With these as well as other objects in view, the invention resides in the novel features of construction and combinations and arrangements of parts as more fully hereinafter set forth.

In the drawing:—

Figure 1 is a plan view of a vehicle hardware article embodying my invention;

Figure 2 is a side elevation thereof;

Figure 3 is a cross section on the line 3—3 of Figure 2;

Figures 4 and 5 are respectively a plan view and a side elevation of an ornamental member adapted to be secured to the body of the vehicle hardware article;

Figure 6 is a cross section on the line 6—6 of Figure 5;

Figure 7 is a plan view of a modification;

Figure 8 is a side elevation thereof;

Figure 9 is a cross section on the line 9—9 of Figure 7 through the ornamental member.

The invention relates in general to vehicle hardware, an example of which is a regulator handle for a window or windshield, as illustrated in the drawing.

As shown in Figures 1, 2 and 3, the regulator handle has the body 1, one end of which is transversely recessed to form the socket 2 for receiving the handle shaft. The opposite or front face of the body is formed with the recess 3 for receiving the ornamental member 4. The contours in plan of the recess 3 and the ornamental member 4 may have a great number of variations, as long as the ornamental member fits in the recess.

The ornamental member 4 is separately shown in Figures 4, 5 and 6 and it may be formed in a great variety of colors. This ornamental member is formed of plastic material, such as bakelite, beatl, plaskon, lumerith, or the like which is molded to shape and which hardens after molding.

For securing the ornamental member to the body, I mold the rivet 5 in place in the ornamental member at the time of molding the latter. This rivet has the enlarged end which is imbedded in the ornamental member below its outer face to thereby conceal the rivet. A portion of the shank of the rivet is also preferably surrounded by the annular flange 7 formed upon the ornamental member. The inner end of the rivet beyond the annular flange 7 is preferably recessed at 8. The body 1 is formed with the opening 9 substantially in axial alignment with the socket 2 and opening into the recess 3. The outer portion of this opening is of a size to receive the annular flange 7 of the ornamental member, while its inner portion is reduced but of a size to receive the inner end of the rivet 6. After assembly of the ornamental member with the body the inner end of the rivet is flanged over against that part of the body at the end of the socket 2, the body being preferably chamfered to engage the turned over flange of the rivet.

In the modification as shown in Figures 7, 8 and 9, the body 10 is in general the same as the body 1. However, the outer face of this body is recessed throughout the greater portion of its length to receive the ornamental member or insert 11, which is correspondingly shaped. This ornamental member or insert is formed in the same manner as the ornamental member or insert 4 with the exception that it is provided with an additional rivet 12 molded thereinto at the time of molding the ornamental member or insert 11. The body 10 is formed with the socket 13 in its inner face and with the opening 14 extending from the socket to the recess in its outer face, this opening being formed in the same manner as the opening 9 to provide for the passage of the rivet 12 and the annular flange 15 of the ornamental member or insert 11, which surrounds the outer end portion of the rivet. The inner end of this rivet 12 is flanged over against that part of the body at the end of the socket 13.

From the above description, it will be readily seen that I have provided a vehicle hardware article which may be readily made ornamental and distinctive in appearance. It will also be seen that I have provided an improved ornamental member or insert and that this ornamental member or insert may be firmly secured to the body of the vehicle hardware in such a way that the securing means is concealed by the ornamental member or insert.

What I claim as my invention is:

1. A regulator handle having in combination a body with a socket formed therein, an ornamental member at the opposite side of the body, and a rivet for securing the ornamental member to the body said ornamental member having a shoulder projecting therefrom and surrounding said rivet and engaging a part of the body at the end of its socket.

2. A regulator handle comprising in combination a body having a recess and a socket communicating therewith, an ornamental member adapted to fit in said recess and having a shoulder projecting therefrom and received in said socket, and a rivet for securing the ornamental member to the body surrounded by said shoulder.

3. A regulator handle comprising a body having a recess, a socket communicating with the recess, and an opening in axial alignment with the socket, a molded ornamental member adapted to fit in said recess, and an element for securing the ornamental member to said body having a portion molded into and concealed by said ornamental member and a second portion secured in said opening, said ornamental member being formed with an annular flange surrounding said securing element and engageable in said socket with its free end abutting the bottom wall thereof.

In testimony whereof I affix my signature.

GEORGE GRAFF.